US010210718B2

(12) United States Patent
Sato et al.

(10) Patent No.: US 10,210,718 B2
(45) Date of Patent: Feb. 19, 2019

(54) EMERGENCY REPORTING APPARATUS, EMERGENCY REPORTING METHOD, AND COMPUTER-READABLE RECORDING MEDIUM

(71) Applicant: CASIO COMPUTER CO., LTD., Shibuya-ku, Tokyo (JP)

(72) Inventors: Yoshihiro Sato, Asaka (JP); Hideo Suzuki, Tokyo (JP); Hiroshi Akao, Higashiyamato (JP); Kiyoshi Ogishima, Akiruno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 239 days.

(21) Appl. No.: 14/936,400

(22) Filed: Nov. 9, 2015

(65) Prior Publication Data

US 2016/0171843 A1 Jun. 16, 2016

(30) Foreign Application Priority Data

Dec. 15, 2014 (JP) ................................ 2014-253449

(51) Int. Cl.

*G07G 3/00* (2006.01)
*H04N 7/18* (2006.01)
*G08B 13/196* (2006.01)
*G07G 1/00* (2006.01)

(52) U.S. Cl.

CPC ........... *G07G 3/003* (2013.01); *G07G 1/0027* (2013.01); *G08B 13/196* (2013.01)

(58) Field of Classification Search

CPC ....... G07G 3/003; H04N 7/183; G08B 13/196
USPC .......................................................... 348/150
See application file for complete search history.

(56) References Cited

U.S. PATENT DOCUMENTS

| | | | | |
|---|---|---|---|---|
| 4,630,110 | A * | 12/1986 | Cotton | G07G 3/003 200/86 R |
| 5,965,861 | A * | 10/1999 | Addy | G01S 3/7865 186/61 |
| 9,317,753 | B2 * | 4/2016 | Saptharishi | G06K 9/00771 |
| 9,589,433 | B1 * | 3/2017 | Thramann | G08B 13/19613 |
| 9,652,762 | B2 * | 5/2017 | Egan | G06Q 20/327 |
| 9,830,511 | B2 * | 11/2017 | Saptharishi | G06K 9/00536 |
| 2004/0213448 | A1 * | 10/2004 | Jou | G07D 7/00 382/135 |

(Continued)

FOREIGN PATENT DOCUMENTS

| | | |
|---|---|---|
| CN | 102044128 A | 5/2011 |
| CN | 102117526 A | 7/2011 |

(Continued)

OTHER PUBLICATIONS

Chinese Office Action dated Jul. 27, 2017 which issued in c ounterpart Chinese Application No. 201510937289.4.

(Continued)

*Primary Examiner* — Zaihan Jiang
(74) *Attorney, Agent, or Firm* — Holtz, Holts & Volek PC

(57) ABSTRACT

An emergency reporting apparatus of the present invention includes: a determining unit that determines an emergency state based on an image photographed by a photographing unit while a cash drawer keeping cash therein is left open; and a reporting unit that transmits an emergency report to a predetermined report addressee based on a result of the determination made by the determining unit.

9 Claims, 11 Drawing Sheets

(56) References Cited

U.S. PATENT DOCUMENTS

| | | | | |
|---|---|---|---|---|
| 2006/0032914 | A1* | 2/2006 | Brewster | A47F 9/045 235/383 |
| 2007/0152837 | A1* | 7/2007 | Bischoff | G06F 19/3418 340/573.1 |
| 2007/0278298 | A1* | 12/2007 | Ali | G06Q 20/20 235/383 |
| 2009/0026270 | A1* | 1/2009 | Connell, II | A47F 9/046 235/462.41 |
| 2010/0277309 | A1* | 11/2010 | Anderson | A61B 5/1113 340/539.13 |
| 2011/0095862 | A1 | 4/2011 | Yang et al. | |
| 2011/0157360 | A1 | 6/2011 | Lee et al. | |
| 2012/0233006 | A1* | 9/2012 | St. George | G07G 1/0018 705/18 |
| 2014/0232863 | A1* | 8/2014 | Paliga | H04N 21/23109 348/143 |
| 2016/0134930 | A1* | 5/2016 | Swafford | A47F 5/0068 725/80 |

FOREIGN PATENT DOCUMENTS

| | | | |
|---|---|---|---|
| JP | 10269455 | A | 10/1998 |
| JP | 2010218446 | A | 9/2010 |
| JP | 5518918 | B2 | 6/2014 |

OTHER PUBLICATIONS

Japanese Office Action dated Apr. 24, 2018 issued in counterpart Japanese Application No. 2014-253449.

* cited by examiner

FIG. 5A
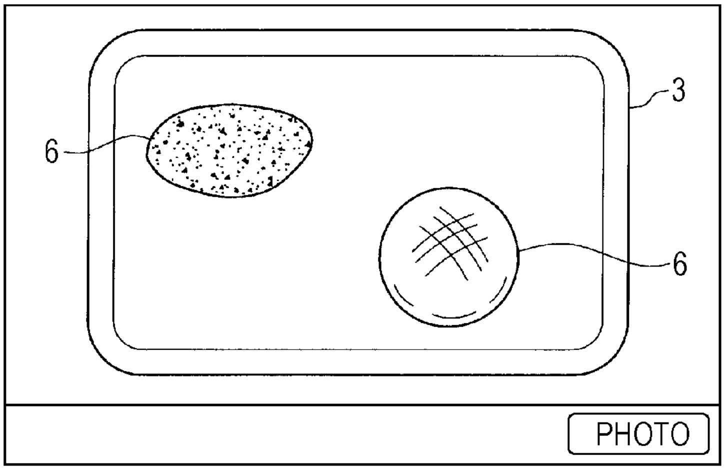
FIG. 5B
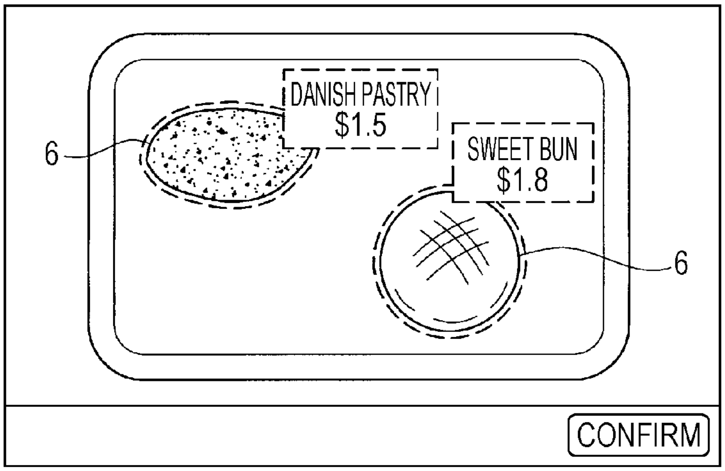
FIG. 5C
| ITEM NAME | UNIT PRICE | QUANTITY |
|---|---|---|
| DANISH PASTRY | $1.5 | 1 |
| SWEET BUN | $1.8 | 1 |
| TOTAL | $3.3 | |
| | | |
| | | |
| | | |
CLEAR

EMERGENCY REPORTING APPARATUS, EMERGENCY REPORTING METHOD, AND COMPUTER-READABLE RECORDING MEDIUM

BACKGROUND OF THE INVENTION

1. Field of the Invention

The present invention relates to an emergency reporting apparatus, an emergency reporting method, and a computer-readable recording medium.

2. Background Art

There has been a generic object recognition technique by which the type and the like of a commercial item are recognized by extracting the feature amounts of the current object from image data captured from the commercial item, and comparing the extracted feature amounts with reference data (feature amounts) prepared in advance. There has been a suggested merchandise item registration apparatus that identifies merchandise items such as fruits and vegetables by using the generic object recognition technique, and registers the sales of the identified merchandise item (see JP 5518918 B2).

In stores where a merchandise item registration apparatus is installed, various measures are taken for security purposes. For example, it is generally known that security cameras and security alarms are installed in stores, and store clerks carry emergency buzzers.

Installation of a security camera is effective in reducing criminal acts such as robbery and providing recorded video images as the sources of evidence of crimes. However, when a criminal act is actually conducted, the fact cannot be instantly reported to the outside without fail.

Meanwhile, installation of a security alarm and carrying an emergency buzzer can make it possible to instantly report a criminal act such as robbery to the outside without fail when such an act is actually conducted. However, if the perpetrator notices the intention to operate a security alarm or the like, the store clerk might be assaulted. Also, if the perpetrator knows about the existence of a security alarm and its operation procedures in advance, the perpetrator might hinder the operation of the security alarm.

SUMMARY OF THE INVENTION

Therefore, the present invention aims to transmit an emergency report through a highly-secretive operation.

An emergency reporting apparatus of the present invention includes: a determining unit that determines an emergency state based on an image photographed by a photographing unit while a cash drawer keeping cash therein is left open; and a reporting unit that transmits an emergency report to a predetermined report addressee based on a result of the determination made by the determining unit.

An emergency reporting method of the present invention includes the steps of: determining an emergency state based on an image photographed by a photographing unit while a cash drawer keeping cash therein is left open; and transmitting an emergency report to a predetermined report addressee based on a result of the determination made in the determining step.

A non-transitory computer-readable recording medium of the present invention stores a program for causing a computer of an emergency reporting apparatus to carry out the steps of: determining an emergency state based on an image photographed by a photographing unit while a cash drawer keeping cash therein is left open; and transmitting an emergency report to a predetermined report addressee based on a result of the determination.

According to the present invention, an emergency can be reported through a highly-secretive operation.

BRIEF DESCRIPTION OF THE DRAWINGS

FIGS. 5A through 5C are diagrams illustrating an example of image transition during the merchandise item registration process according to the first embodiment;

FIG. 7A illustrates a situation where the largest denomination bills are photographed; FIG. 7B illustrates a situation where items to be used for crimes are photographed; and FIG. 7C illustrates a situation where the largest denomination bills held by an operator (store clerk) are photographed;

FIG. 10A illustrates a situation where spread hands are photographed; FIG. 10B illustrates a situation where clinched fists are photographed; and FIG. 10C illustrates a situation where a hand moving right and left is photographed.

DETAILED DESCRIPTION OF THE PREFERRED EMBODIMENT

Figure 1:
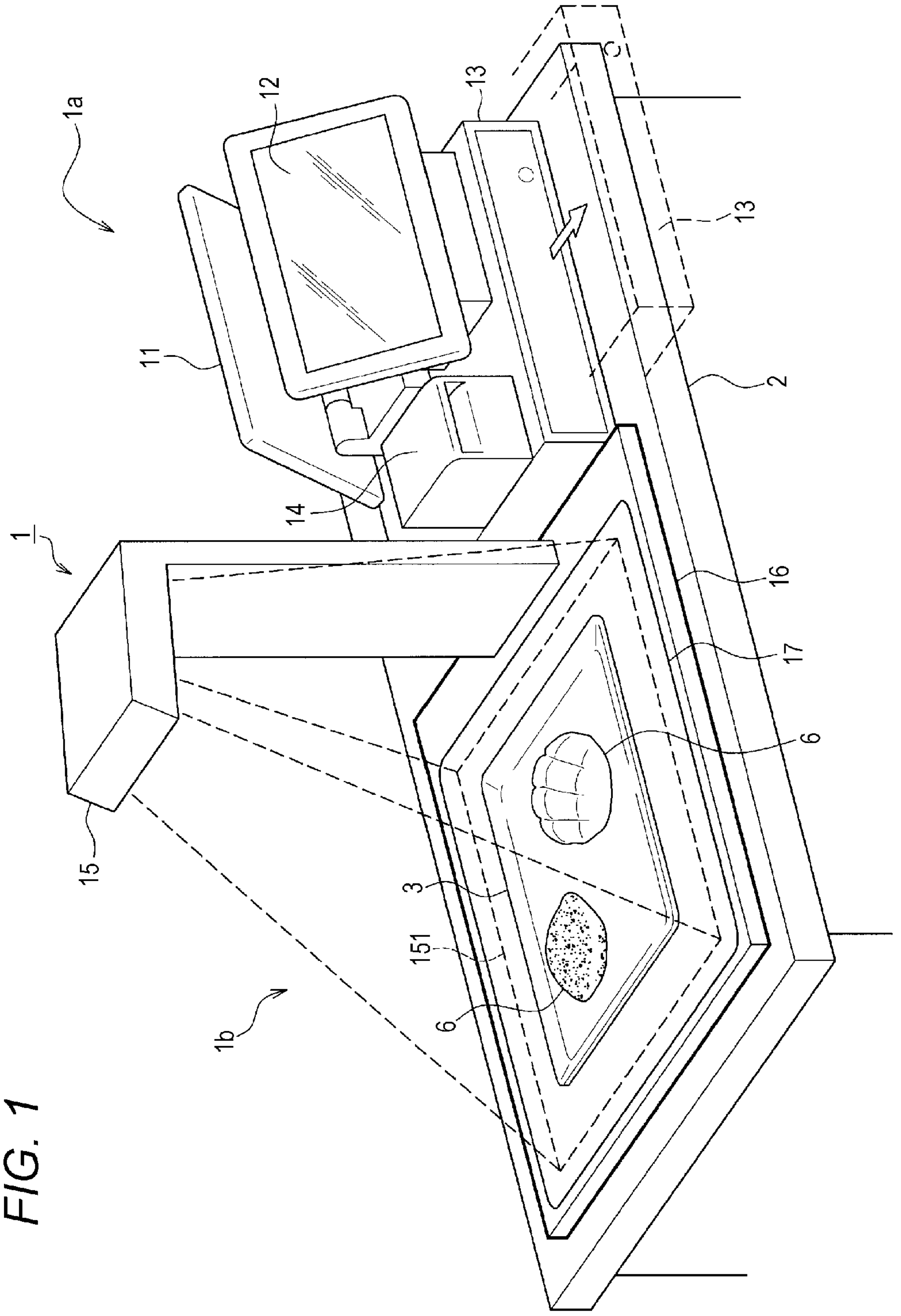
FIG. 1 is a perspective view of the exterior of a merchandise item registration apparatus according to a first embodiment.

The following is a detailed description of embodiments of the present invention, with reference to the accompanying drawings.

The respective drawings are simplified to such a degree that the present invention can be sufficiently understood. Therefore, the present invention is not limited to the examples illustrated in the drawings. In some of the drawings to be referred to, the sizes of the components of the present invention are illustrated in an exaggerated manner, for ease of explanation. It should be noted that like components are denoted by like reference numerals in the respective drawings, and explanation of such components will not be repeated more than once.

[First Embodiment]

FIG. 1 is a perspective view of a merchandise item registration apparatus 1 according to a first embodiment.

As shown in FIG. 1, the merchandise item registration apparatus 1 includes a cash register 1*a* and a merchandise item identification device 1*b*, and is placed on a counter table 2 in a merchandise sales store.

The cash register 1*a* includes a customer display 11, a touch display 12, a cash drawer 13, and a printer 14. The merchandise item identification device 1*b* includes a photographing device 15, a photographing table 16, and a backlight source 17.

The merchandise item identification device 1*b* processes an image taken by the photographing device 15, to identify the type and the quantity of the available merchandise items 6 placed on a tray 3, and transmit the identification information to the cash register 1*a*. Here, available merchandise items mean merchandise items that are sold (available) in the store where the merchandise item registration apparatus 1 is installed. Receiving the identification information, the cash register 1*a* displays the total amount, and performs calculation and inputting/outputting of sales management, sales achievement control, and the like.

When the payment for available merchandise items is handled, the operator (store clerk) who operates the merchandise item registration apparatus 1 stands on the front side (in the drawing) of the counter table 2. Meanwhile, the customer stands on the back side (in the drawing) of the counter table 2.

The customer display 11 is a liquid crystal display device, for example, and faces the back side (in the drawing), which is the customer side. The customer display 11 displays, to the customer, information (such as trade names and a sum) related to payment for available merchandise items.

The touch display 12 is formed by stacking a touch panel 12B on the surface of a display 12A (see FIG. 2) that is a liquid crystal display device, for example, and faces the front side (in the drawing), which is the operator side. This touch display 12 displays a photographed image and various kinds of information (such as trade names and a sum) to the operator, and also receives a touch operation input performed by the operator.

The cash drawer (also referred to simply as the "drawer" in some cases) 13 is a drawer that keeps bills, coins, cash vouchers, and the like to be handled at the time of payment for the available merchandise items, and is located immediately below the touch display 12. When the operator (store clerk) operates the touch display 12, the cash drawer 13 slides open toward the front side (the position indicated by dashed lines in the drawing).

The printer 14 is located to the lower left of the touch display 12, and prints the specifics (trade names, a sum, and the like) of payment at the time of payment for the available merchandise items.

The photographing device 15 takes an image of the tray 3 placed on the photographing table 16, and the available merchandise items placed on the tray 3, from straight above. An illuminating device (not shown) is provided adjacent to the photographing device 15, and illuminates the photographing area 151 to be photographed by the photographing device 15. The available merchandise items are homemade pastries, for example. When the photographing device 15 performs photographing, the pastries 6 on the tray 3 are illuminated with illumination light from the illuminating device, and, from below the tray 3, backlight is emitted upward from the backlight source 17. This tray 3 is not transparent, but is semi-transparent and is in a single color without any pattern or the like, so that light passes through the tray 3 upward and downward. The tray 3 is preferably white or in a pale color. Further, it is preferable to have the upper surface of the tray 3 subjected to fine matting. With the fine matting, illumination light from the illuminating device can be restrained from being reflected.

The customer places any desired number of pastries 6 as available merchandise items onto the tray 3, and then places the tray 3 onto the photographing table 16. In the example illustrated in FIG. 1, two pastries 6 are placed on the tray 3.

The photographing table 16 is the table on which the tray 3 holding the available merchandise items thereon is placed by the customer who is about to purchase the available merchandise items places.

The photographing area 151 on the photographing table 16 is the area in which the photographing device 15 can perform photographing.

The backlight source 17 is housed inside the photographing table 16, and emits backlight upward from below the tray 3 so that a photographed image of the available merchandise items becomes clearer when the available merchandise items on the tray 3 are photographed by the photographing device 15. The backlight source 17 can be realized by an LED (Light Emitting Diode), for example, but is not limited to that.

The tray 3 is semi-transparent so as to allow light to pass therethrough. When the pastries 6 placed on the tray 3 are photographed by the photographing device 15, backlight is emitted from the backlight source 17 to the back surface of the tray 3. With this, shadows to be formed around the pastries 6 as available merchandise items due to the illumination light from the illuminating device can be eliminated as much as possible. So as to have backlight emitted from the backlight source 17 when the photographing device 15 performs photographing, the backlight source 17 is always left on. However, the present invention is not limited to that, and switching on the backlight source 17 and photographing by the photographing device 15 may be synchronized. So as to realize this, the merchandise item identification device 1*b* may collectively control the photographing device 15 and the backlight source 17, and the backlight source 17 may be switched on in synchronization with photographing performed by the photographing device 15.

Figure 2:
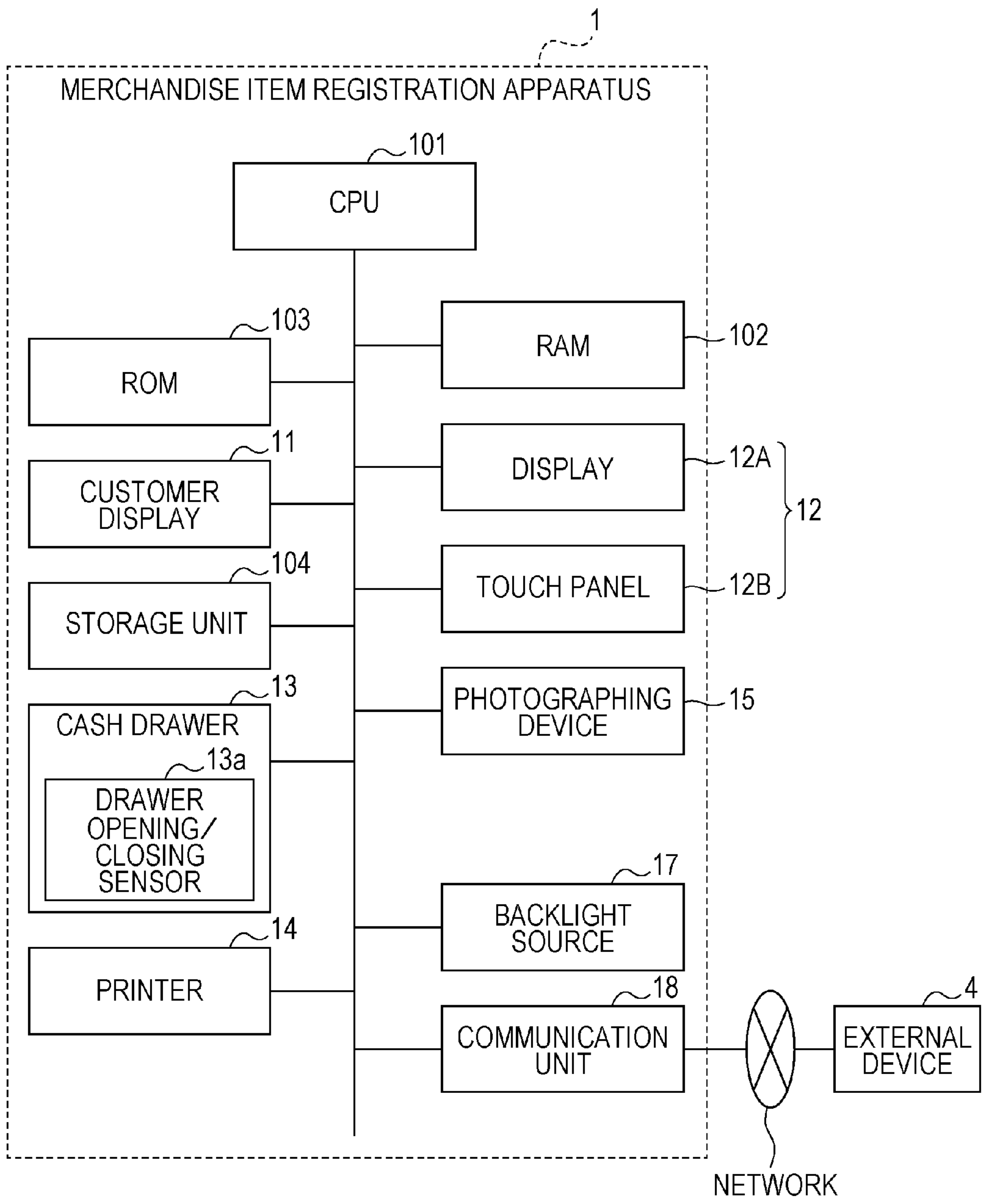
FIG. 2 is a diagram schematically illustrating the structure of the merchandise item registration apparatus according to the first embodiment.

FIG. 2 is a diagram schematically illustrating the structure of the merchandise item registration apparatus 1 according to the first embodiment.

In addition to the components illustrated in FIG. 1, the merchandise item registration apparatus 1 includes a CPU (Central Processing Unit) 101, a RAM (Random Access Memory) 102, a ROM (Read Only Memory) 103, a storage unit 104, and a communication unit 18. It should be noted that the respective components of the merchandise item registration apparatus 1 illustrated in FIG. 2 are connected to one another in a communicable manner via an internal bus and respective input/output circuits (not shown).

The CPU 101 is the central control unit, and controls the entire merchandise item registration apparatus 1.

The RAM 102 is a temporary storage unit used by the CPU 101, and temporarily stores image data and various kinds of variables related to the program that is executed by the CPU 101.

The ROM 103 is a nonvolatile storage unit, and stores the program and the like that are executed by the CPU 101.

The customer display 11 is controlled by the CPU 101, and displays, to the customer, information (such as trade names and a sum) related to the photographed image of the available merchandise items and payment for the available merchandise items.

The display 12A is controlled by the CPU 101, and displays, to the operator, information (such as trade names and a sum) related to the photographed image of the available merchandise items and payment for the available merchandise items.

The touch panel 12B receives a touch operation input corresponding to the information displayed on the display 12A from the operator.

The storage unit 104 is formed with an HDD (Hard Disk Drive) or an SSD (Solid State Drive), for example, and stores various programs and various files. All or some of the various programs and the various files stored in the storage unit 104 are copied into the RAM 102 and are executed by the CPU 101 when the merchandise item registration apparatus 1 is activated. Various kinds of data are stored in this storage unit 104.

The photographing device 15 is a photographing unit that is formed with a color CCD (Charge Coupled Device) image sensor, a color CMOS (Complementary Metal Oxide Semiconductor) image sensor, or the like, and performs photographing under the control of the CPU 101. The photographing device 15 takes a 30 fps (frame per second) moving image, for example. Frame images (photographed images) sequentially taken by the photographing device 15 at a predetermined frame rate are stored into the RAM 102.

Under the control of the CPU 101, the backlight source 17 emits backlight upward from below the tray 3 so that the photographed image becomes clearer when the available merchandise items on the tray 3 are photographed by the photographing device 15. With this, the shadows formed in the photographing area 151 due to the illumination light from the illuminating device and other light in the store become thinner, and image processing accuracy can be increased.

The backlight source 17 may emit backlight at the same timing as the photographing device 15 performing photographing, or may constantly emit back light, for example.

The cash drawer 13 is opened in accordance with an instruction from the CPU 101. The cash drawer 13 includes a drawer opening/closing sensor 13*a*. The drawer opening/closing sensor 13*a* may detect at least one of an opened state and a closing state of the cash drawer 13, and transmit the result of the detection to the CPU 101, for example. The drawer opening/closing sensor 13*a* may detect a state change when the cash drawer 13 changes from an opened state to a closed state and when the cash drawer changes from a closed state to an opened state, and transmit the result of the detection to the CPU 101.

The printer 14 is a thermal transfer printer, for example, and issues a receipt. Specifically, the printer 14 prints the specifics of payment on a receipt sheet in accordance with an instruction from the CPU 101 at the time of payment for the available merchandise items.

The communication unit 18 is a network interface controller, for example, and is connected to an external device 4 via a network. The external device 4 is a device installed in a space isolated from a space in which the merchandise item registration apparatus 1 is installed. For example, the external device 4 is installed in a backyard, the headquarters, a data center, a security company, or the like. The CPU 101 uses this communication unit 18 to transmit an emergency report described later to the external device 4.

Figure 3:
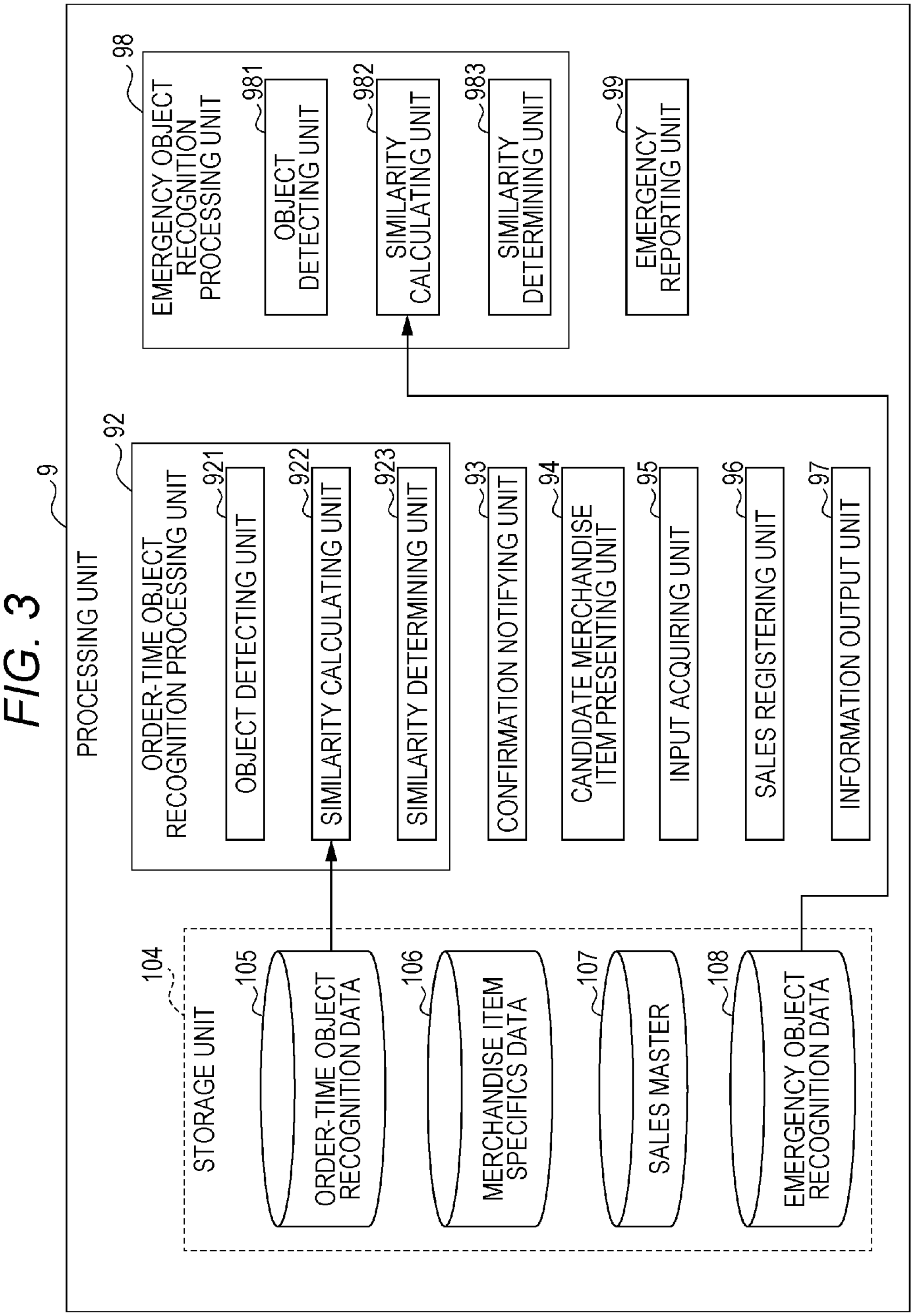
FIG. 3 is a logical block diagram illustrating the structure of the merchandise item registration apparatus according to the first embodiment.

FIG. 3 is a logical block diagram illustrating the merchandise item registration apparatus 1 according to the first embodiment.

The CPU 101 (see FIG. 2) of the merchandise item registration apparatus 1 executes a program (not shown) stored in the ROM 103 (see FIG. 2), to embody, as a processing unit 9, a storage unit 104, an order-time object recognition processing unit 92, a confirmation notifying unit 93, a candidate merchandise item presenting unit 94, an input acquiring unit 95, a sales registering unit 96, an information output unit 97, an emergency object recognition processing unit 98, and an emergency reporting unit 99. The order-time object recognition processing unit 92 includes an object detecting unit 921, a similarity calculating unit 922, and a similarity determining unit 923. The emergency object recognition processing unit 98 includes an object detecting unit 981, a similarity calculating unit 982, and a similarity determining unit 983.

The processing unit 9 refers to order-time object recognition data 105, merchandise item specifics data 106, a sales master 107, and emergency object recognition data 108, which are stored in the storage unit 104.

In the order-time object recognition data 105, template information generated by combining modeled feature amounts of each of the types of available merchandise items is registered in advance. The order-time object recognition data 105 is a data file in which the trade names and the merchandise item IDs of the respective merchandise items available in the store are associated with the feature amounts of the respective merchandise items, and functions as a dictionary for recognizing the available merchandise items.

The merchandise item specifics data 106 is a data file in which the information about the specifics of the available merchandise items is set. In the merchandise item specifics data 106, merchandise item IDs (IDentifiers), trade names, unit prices, discount information, and the like are set as the information about the specifics of the available merchandise items.

The sales master 107 is a file that records the sales registration of the available merchandise items. Specifically, the merchandise item IDs of the merchandise items sold to customers, the corresponding merchandise classifications, the trade names, the unit prices, the quantities sold, and the like are recorded.

In the emergency object recognition data 108, template information generated by combining modeled feature amounts of each of the emergency-indicating events is registered in advance. With respect to an event indicating an emergency state that occurs in the vicinity of the merchandise item registration apparatus 1, for example, the emergency object recognition data 108 serves a data file in which the specifics of the emergency state are associated with the feature amounts of the event indicating the emergency state, and functions as a dictionary for recognizing the emergency state.

An emergency state is a state where an operator (store clerk) needs to ask for help due to an act of a third party. In an example case in this embodiment, a third party demands bills in the cash drawer 13 from the operator (a criminal act such as robbery or extortion is conducted).

Examples of emergency-indicating events include objects demanded by perpetrators (such as bills, coins, an emergency buzzer, a portable telephone with which contact with the outside can be made), and objects used for crimes (such as keys to the store or vehicles, and weapons). In the case of the United States, there are 1-dollar bills, 2-dollar bills, 5-dollar bills, 10-dollar bills, 20-dollar bills, 50-dollar bills and 100-dollar bills. As an emergency-indicating event, 100-dollar bills are particularly effective, being the largest denomination bills. Since the largest denomination bills are not used as change in a transaction, the largest denomination bills are used as an emergency-indicating event, so that wrong transmission of an emergency report described later can be prevented.

The storage unit 104 sequentially captures and stores frame images (color digital images) taken by the photographing device 15.

The object detecting unit 921 separates the images of candidate available merchandise items from the background in a captured frame image, or cuts out and detects only the objects to be identified from the background, using a technique such as edge detection. Specifically, when a customer places the tray 3 on the photographing table 16, and the operator issues a photographing instruction, the processing unit 9 takes an image of the photographing area 151 on the photographing table 16 with the photographing device 15. The object detecting unit 921 digitizes an acquired frame image, and extracts the contour. The object detecting unit 921 then compares the contour extracted from the previous frame image with the contour extracted from the current frame image, to divide the image into respective regions and detect the objects.

The similarity calculating unit 922 identifies the types of the respective available merchandise items based on the separated images of the respective detected objects. With respect to each of the separated images, the similarity calculating unit 922 calculates feature amounts that are the size, the shape, the color shade, and the surface state such as irregularities on the surface.

The similarity calculating unit 922 further compares the feature amounts of the respective separated images with the respective feature amounts of the available merchandise items recorded in the order-time object recognition data 105, to calculate the degrees of similarity between the respective separated images and the available merchandise items recorded in the order-time object recognition data 105.

Where feature amounts to be supposedly obtained from the respective available merchandise items recorded in the order-time object recognition data 105 each have the degree of similarity of 100%, the degrees of similarity calculated here indicate how similar the feature amounts of the respective separated images are to those of the recorded merchandise item images. In a case where there are two or more kinds of feature amounts, the similarity calculating unit 922 performs a comprehensive evaluation based on the feature amounts, and each of the feature amounts may be weighted.

Recognizing an object included in an image in the above manner is called generic object recognition. In "The Current State and Future Directions on Generic Object Recognition" by Keiji Yanai, data set and evaluation benchmark tests are conducted by taking into account the surveys on generic object recognition studies, and future directions of generic object recognition are predicted:

Keiji Yanai, "The Current State and Future Directions on Generic Object Recognition", [online] IPSJ Transaction, Nov. 15, 2007, Vol. 48, No. SIG16, pp. 1-24, [Retrieved on Oct. 31, 2014], <URL:http://mm.cs.uec.ac.jp/IPSJ-TCVIM-Yanai.pdf>

A technique for performing generic object recognition by dividing an image into regions for each object is disclosed in the following literature: Jamie Shotton, et al., "Semantic Texton Forests for Image Categorization and Segmentation", Computer Vision and Pattern Recognition, 2008. CVPR 2008. IEEE Conference on, [retrieved on Oct. 31, 2014], <URL:http://citeseerx.ist.psu.edu/viewdoc/download?doi=10.1.1.145.3036 &rep=rep1& type=pdf>.

It should be noted that there are no particular limits on the method of calculating the degrees of similarity between the feature amounts of the photographed merchandise item images and the feature amounts of the merchandise item images of the available merchandise items recorded in the order-time object recognition data 105. For example, the degrees of similarity between the feature amounts of photographed merchandise item images and the feature amounts of the respective available merchandise items recorded in the order-time object recognition data 105 may be calculated as absolute evaluations, or may be calculated as relative evaluations.

In a case where degrees of similarity are calculated as absolute evaluations, the feature amounts of the separated images are compared with the feature amounts of the available merchandise items recorded in the order-time object recognition data 105 on a one-to-one basis, and the degrees of similarity (0 to 100%) calculated as a result of the comparison should be employed as they are.

In a case where degrees of similarity are calculated as relative evaluations, the calculation is performed so that the total sum of the degrees of similarity to the respective available merchandise items becomes 1.0 (100%). For example, the feature amounts of available merchandise items A and B might be stored in the order-time object recognition data 105.

In the separated images in this case, the degree of similarity to the available merchandise item A is calculated to be 0.65, and the degree of similarity to the available merchandise item B is calculated to be 0.2, for example.

For each of the separated images of objects, the similarity determining unit 923 makes one of the three determinations shown below on the corresponding available merchandise item based on the degree of similarity calculated by the similarity calculating unit 922, for example.

(1) The available merchandise item corresponding to the separated image is uniquely determined.

(2) There exists one or more candidate available merchandise items corresponding to the separated image.

(3) There is not an available merchandise item corresponding to the separated image.

The storage unit 104 stores conditions X and Y as the conditions for this determination, for example. In the example described below, the similarity calculation method is an absolute evaluation calculation method.

When the condition X is satisfied, the above determination (1) is made. The condition X is "the degree of similarity to the most similar available merchandise item is 90% or higher", and "the difference between the degree of similarity to the most similar available merchandise item and the degree of similarity to the second most similar available merchandise item is 20% or larger", for example. Specifically, as for the object in a separated image, the degree of similarity to the most similar available merchandise item, which is the available merchandise item A, is 95%, and the degree of similarity to the second most similar available merchandise item, which is the available merchandise item B, is 60%, for example. Since the condition X is satisfied in this case, the available merchandise item A is uniquely determined to be the available merchandise item corresponding to the separated image.

If the condition X is not satisfied, the condition Y is used.

When the condition Y is satisfied, the above determination (2) is made. The condition Y is "there is one or more available merchandise items to which the degrees of similarity are 60% or higher", for example. Specifically, as for the object in a separated image, the degree of similarity to the most similar available merchandise item A is 80%, the degree of similarity to the second most similar available merchandise item B is 75%, the degree of similarity to the third most similar available merchandise item, which is an available merchandise item C, is 65%, and the degree of similarity to the fourth most similar available merchandise item, which is an available merchandise item D, is 55%, for example. Since the condition Y is satisfied in this case, the available merchandise items A, B, and C to which the degrees of similarity are 60% or higher are the candidates for the available merchandise item corresponding to the separated image.

If both of the conditions X and Y are not satisfied, the above determination (3) is made. Each of the above conditions X and Y is merely an example, and conditions are not limited to them.

In a case where the similarity calculation method is a relative evaluation calculation method, the conditions can be set in the same manner as above.

The confirmation notifying unit 93 notifies the operator or the customer that an available merchandise item is uniquely determined to be the object in a separated image on which the similarity determining unit 923 has made the above determination (1), by displaying the notification on the display 12A and the customer display 11 or outputting sound.

More specifically, the confirmation notifying unit 93 indicates that the available merchandise item corresponding to the separated image is uniquely determined, by displaying the separated image on which the similarity determining unit 923 has made the above determination (1), together with a green outline, on the customer display 11 and the display 12A.

The candidate merchandise item presenting unit 94 indicates that there is one or more candidate available merchandise items corresponding to the separated image, by displaying the separated image on which the similarity determining unit 923 has made the above determination (2), together with a yellow outline, on the display 12A and the customer display 11. Further, when the operator touches this separated image on the touch panel 12B, the display 12A displays photographed images and the trade names of the candidate available merchandise items in descending order of similarity.

At this point, the candidate merchandise item presenting unit 94 reads the photographed images and the trade names of the available merchandise items satisfying the condition Y from the order-time object recognition data 105 and the merchandise item specifics data 106, and sequentially outputs the photographed images and the trade names to the display 12A in descending order of similarity calculated by the similarity calculating unit 922.

In a case where a selecting operation on these candidate available merchandise items is not accepted even though the photographed images of the candidate merchandise items are displayed on the display 12A, the photographing by the photographing device 15, the image storage process by the storage unit 104, the object detection process by the object detecting unit 921, and the similarity calculation process by the similarity calculating unit 922 are continued.

The input acquiring unit 95 accepts various input operations corresponding to the information displayed on the display 12A via the touch panel 12B. For example, in a case where the above determination (2) is made, and a separated image is displayed together with a yellow outline on the display 12A, the input acquiring unit 95 accepts a touch input operation from the operator using the touch panel 12B to select the separated image. Further, in a case where one or more candidate available merchandise items are displayed on the display 12A, the input acquiring unit 95 accepts a touch input operation from the operator using the touch panel 12B to select a merchandise item.

The sales registering unit 96 registers the sales of the corresponding available merchandise item based on the merchandise item ID that has been output from the information output unit 97. Specifically, the sales registering unit 96 performs sales registration by recording the reported merchandise item ID, the corresponding merchandise classification, the trade name, the unit price, the quantity of sales, and the like into the sales master 107, for example.

The information output unit 97 refers to the merchandise item specifics data 106 for the available merchandise item determined in the above manner, and then outputs the information (such as the merchandise item ID (IDentifier), the trade name, and discount information) indicating the available merchandise item, to the customer display 11, the display 12A, and the printer 14.

The object detecting unit 981 separates the images of candidate emergency-indicating events (such as bills) from the background in a captured frame image, or cuts out and detects only the events to be identified from the background, using a technique such as edge detection. Specifically, when the drawer opening/closing sensor 13*a* detects opening of the cash drawer 13, the processing unit 9 takes an image of the photographing area 151 on the photographing table 16 with the photographing device 15. The object detecting unit 981 digitizes an acquired frame image, and extracts the contour. The object detecting unit 981 then compares the contour extracted from the previous frame image with the contour extracted from the current frame image, to divide the image into respective regions and detect emergency-indicating events.

The similarity calculating unit 982 identifies the emergency-indicating events (such as bills) based on the separated images of the respective detected objects. With respect to each of the separated images, the similarity calculating unit 982 calculates feature amounts that are the size, the shape, the color shade, and the surface state such as irregularities on the surface.

The similarity calculating unit 982 further compares the feature amounts of the respective separated images with the respective feature amounts of the emergency-indicating events recorded in the emergency object recognition data 108, to calculate the degrees of similarity between the respective separated images and the emergency-indicating events recorded in the emergency object recognition data 108.

Where feature amounts to be supposedly obtained from the emergency-indicating events recorded in the emergency object recognition data 108 each have the degree of similarity of 100%, the degrees of similarity calculated here indicate how similar the feature amounts of the respective separated images are to those of the recorded emergency-indicating events. In a case where there are two or more kinds of feature amounts, the similarity calculating unit 982 performs a comprehensive evaluation based on the feature amounts, and each of the feature amounts may be weighted.

It should be noted that there are no particular limits on the method of calculating the degrees of similarity between the feature amounts of images of photographed emergency-indicating events (such as bills) and the feature amounts of images of the emergency-indicating events recorded in the emergency object recognition data 108. For example, the degrees of similarity between the feature amounts of photographed events and the feature amounts of the respective emergency-indicating events recorded in the emergency object recognition data 108 may be calculated as absolute evaluations, or may be calculated as relative evaluations.

In a case where degrees of similarity are calculated as absolute evaluations, the feature amounts of the separated images are compared with the feature amounts of the emergency-indicating events (such as bills) recorded in the emergency object recognition data 108 on a one-to-one basis, and the degrees of similarity (0 to 100%) calculated as a result of the comparison should be employed as they are.

In a case where degrees of similarity are calculated as relative evaluations, the calculation is performed so that the total sum of the degrees of similarity to the emergency-indicating events becomes 1.0 (100%). For example, the feature amounts of events A and B might be stored in the emergency object recognition data 108. In the separated images in this case, the degree of similarity to the event A is calculated to be 0.65, and the degree of similarity to the event B is calculated to be 0.2, for example.

For each of the separated images of objects, the similarity determining unit 983 makes one of the two determinations shown below on the corresponding event based on the degree of similarity calculated by the similarity calculating unit 982, for example.

(4) The event corresponding to the separated image is uniquely determined.

(5) There is not an event corresponding to the separated image.

The storage unit 104 stores a condition Z as the condition for this determination, for example.

In the example described below, the similarity calculation method is an absolute evaluation calculation method.

When the condition Z is satisfied, the above determination (4) is made. The condition Z is "the degree of similarity to the most similar event is 90% or higher", and "the difference between the degree of similarity to the most similar event and the degree of similarity to the second most event is 20% or larger", for example. Specifically, as for the object in a separated image, the degree of similarity to the most similar event, which is the event A, is 95%, and the degree of similarity to the second most similar event, which is the event B, is 60%, for example.

Since the condition Z is satisfied in this case, the event A is uniquely determined to be the event corresponding to the separated image. In this case, it is preferable not to notify that an emergency-indicating event is uniquely determined to be the object in a separated image on which the above determination (4) has been made, by displaying the notification on the display 12A and the customer display 11 or outputting sound. This is to prevent third parties (particularly perpetrators) from noticing that an emergency report is being made.

If the condition Z not satisfied, the above determination (5) is made. In a case where the similarity calculation method is a relative evaluation calculation method, the conditions can also be set in the same manner as above.

The above condition Z is merely an example, and conditions are not limited to that. For example, the condition Z may be "there is one or more events to which the degrees of similarity are 60% or higher". Specifically, as for the object in a separated image, the degree of similarity to the most similar event, which is the event A, is 80%, and the degree of similarity to the second most similar event, which is the event B, is 75%, for example.

Since the condition Z is satisfied in this case, the events A and B to which the degrees of similarity are 60% or higher are the candidates for the event corresponding to the separated image. In this case, it is preferable not to display, on the display 12A and the customer display 11, the notification that there is one or more candidates for the event corresponding to the separated image. This is to prevent third parties (particularly perpetrators) from noticing that an emergency report is being made.

In a case where an emergency state is determined (when the above determination (4) is made, for example), the emergency reporting unit 99 transmits an emergency report to the external device 4 via the communication unit 18 (see FIG. 2). There may be various means of reporting an emergency and various contents of an emergency report. For example, information simply indicating that there is an emergency state may be transmitted, or a photographed image from which an emergency state has been determined may be transmitted. Alternatively, information indicating that there is an emergency state, and the photographed image from which the emergency state has been determined may be transmitted together.

(Merchandise Item Registration Process)

Figure 4:
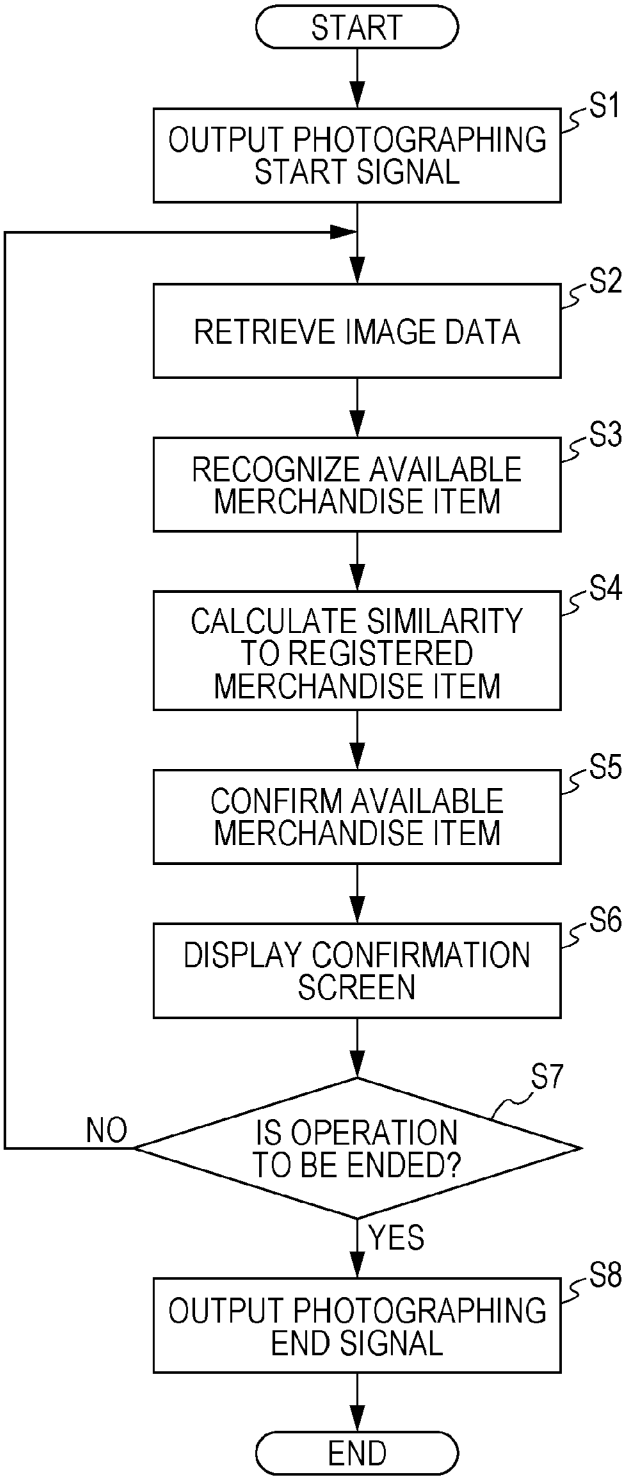
FIG. 4 is a diagram illustrating an example of a flowchart of the entire operation in a merchandise item registration process in the merchandise item registration apparatus according to the first embodiment.

Referring now to FIGS. 4 and 5 (as well as FIGS. 1 through 3 if necessary), a merchandise item registration process using the merchandise item registration apparatus 1 is described.

FIG. 4 is a diagram illustrating an example of a flowchart of the entire operation in a merchandise item registration process to be performed by the merchandise item registration apparatus 1.

FIGS. 5A through 5C are diagrams illustrating an example of image transition in the merchandise item registration apparatus 1.

First, the processing unit 9 outputs a photographing start signal to the photographing device 15, to cause the photographing device 15 to start photographing (step S1). The frame images (color digital images) taken by the photographing device 15 are sequentially captured and stored into the storage unit 104. The object detecting unit 921 retrieves a frame image (photographed image) from the storage unit 104 (step S2), and recognizes an available merchandise item from the retrieved image (step S3). Specifically, when the operator issues an instruction to photograph available merchandise items, the available merchandise items are recognized as objects (see FIG. 5A). In FIG. 5A, two available merchandise items 6 are recognized as objects.

The similarity calculating unit 922 then reads the feature amounts of the available merchandise item from the image of the available merchandise item, and calculates the degrees of similarity to registered merchandise items by comparing the read feature amounts with the feature amounts of the respective merchandise item images registered in the order-time object recognition data 105 (step S4). If the available merchandise item is uniquely determined, the similarity determining unit 923 confirms the available merchandise item to be a registered merchandise item. If the available merchandise item is not uniquely determined, and there are candidates for the available merchandise item, the candidate merchandise item presenting unit 94 displays the information indicating the candidate merchandise items on the display 12A, and a registered merchandise item is confirmed by a select operation performed by the operator (step S5). The confirmation notifying unit 93 then displays the information (a confirmation screen) indicating the confirmed registered merchandise item on the display 12A and the customer display 11 (step S6). In FIG. 5B, "Danish pastry"

and "sweet bun" are determined as available merchandise items, and these available merchandise items are confirmed to be registered merchandise items (see FIG. 5C). The operator then performs checkout.

The processing unit 9 then determines whether an operation end instruction has been issued from the operator (step S7). If the operation is to be continued ("No" in step S7), the processing unit 9 returns the process to step S2, and moves on to the next merchandise item registration process. If the operation is to be ended in accordance with an instruction from the operator ("Yes" in step S7), the processing unit 9 outputs a photographing end signal to the photographing device 15, and ends the photographing by the photographing device 15 (step S8).

(Emergency Reporting Process)

Figure 6:
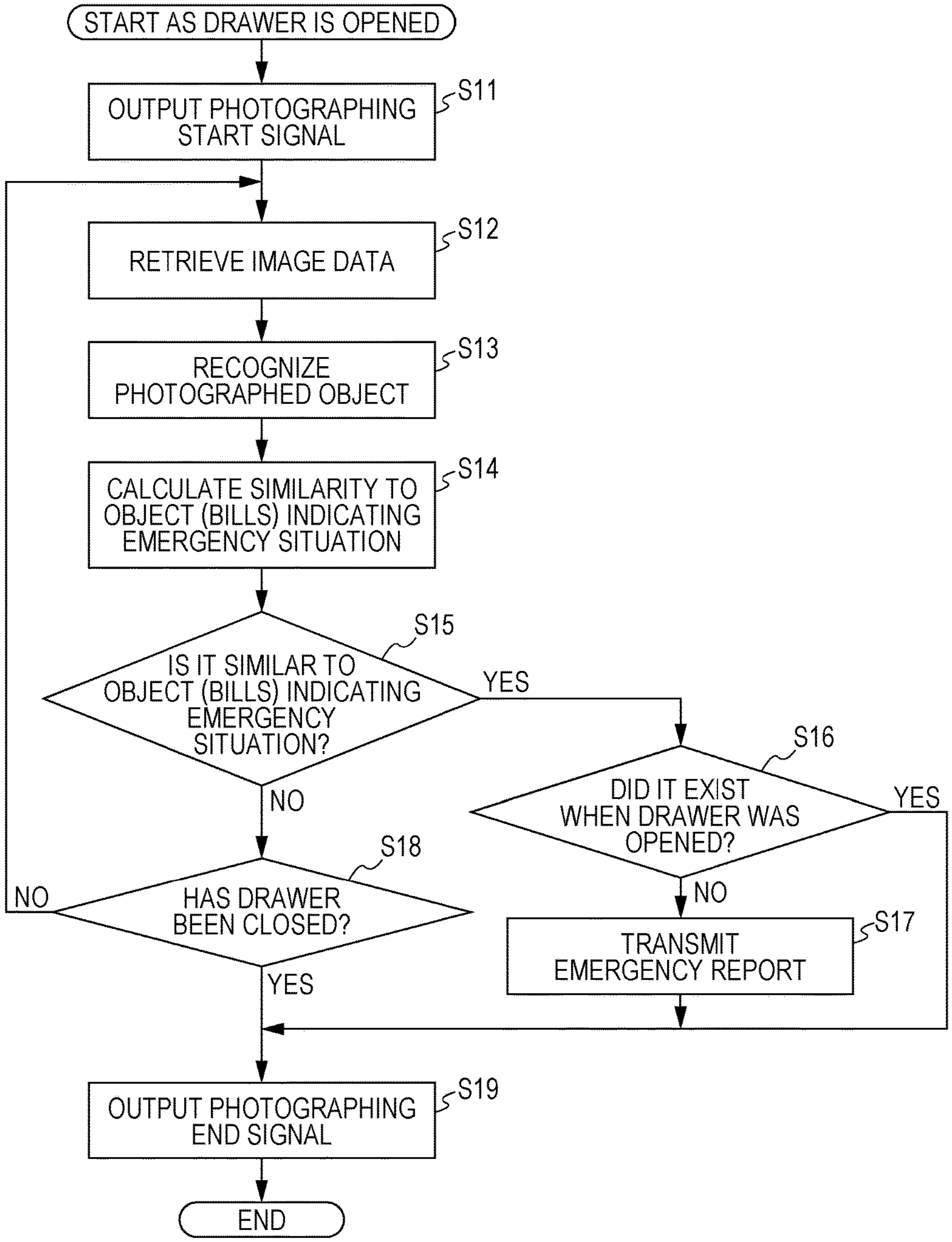
FIG. 6 is a diagram illustrating an example of a flowchart of the entire operation in an emergency reporting process in the merchandise item registration apparatus according to the first embodiment.

Referring now to FIG. 6 (as well as FIGS. 1 through 3 if necessary), an emergency reporting process using the merchandise item registration apparatus 1 is described. FIG. 6 is a diagram illustrating an example of a flowchart of the entire operation in an emergency reporting process to be performed by the merchandise item registration apparatus 1.

In this example, a perpetrator pretends to purchase an available merchandise item, and then demands money from the operator (store clerk) of the merchandise item registration apparatus 1. After demanding money, the perpetrator threatens the operator with a weapon (such as a knife or a gun) he/she is carrying, and closely watches the operator, so as to make the operator obey his/her command and prevent the operator from making contact with the outside.

Therefore, the operator can neither shout for help nor press an emergency button. The operator has no choice but to obey the perpetrator's command, and hands 100-dollar bills in the cash drawer 13 to the perpetrator. It should be noted that the cash drawer 13 is closed at this point.

When the operator (store clerk) opens the cash drawer 13 (see FIG. 2), the drawer opening/closing sensor 13*a* (see FIG. 2) detects the opening of the cash drawer 13, and the processing unit 9 outputs a photographing start signal to the photographing device 15, to cause the photographing device 15 to start photographing (step S11). The frame images (color digital images) taken by the photographing device 15 are sequentially captured and stored into the storage unit 104 (see FIG. 3). Specifically, when the operator puts the 100-dollar bills 51 taken out from the cash drawer 13 onto the photographing table 16, the photographing device 15 takes images of the 100-dollar bills 51 (see FIG. 7A).

The object detecting unit 981 then retrieves a frame image (photographed image) from the storage unit 104 (step S12), and detects a photographed object from the retrieved image (step S13). To be more specific, the bills placed on the photographing table 16 by the operator are recognized as an object.

The similarity calculating unit 982 then reads the feature amounts of the photographed object from the retrieved image, and calculates the degrees of similarity to emergency-indicating events by comparing the read feature amounts with the feature amounts of the respective emergency-indicating events (such as bills) registered in the emergency object recognition data 108 (step S14).

The similarity determining unit 983 then determines to which emergency-indicating event the photographed object is similar (step S15). If there is a similar emergency-indicating event ("Yes" in step S15), the process moves on to step S16. If there is not a similar emergency-indicating event ("No" in step S15), the process moves on to step S18. If there is not a similar emergency-indicating event, nothing might have been photographed.

If the photographed object is similar to an emergency-indicating event ("Yes" in step S15), the processing unit 9 determines whether the photographed object was on the photographing table 16 when the cash drawer 13 was opened (step S16). This procedure is carried out to prevent wrong transmission of an emergency report. This procedure is effective in a case where a customer inadvertently drops a bill onto the photographing table 16 while paying for a merchandise item, for example. Therefore, this procedure may not be carried out, or some other procedure for preventing wrong transmission of an emergency report may be carried out.

If the photographed object was not on the photographing table 16 when the cash drawer 13 was opened ("No" in step S16), the process moves on to step S17. If the photographed object was on the photographing table 16 when the cash drawer 13 was opened ("Yes" in step S16), the process moves on to step S19.

If the photographed object was not on the photographing table 16 when the cash drawer 13 was opened ("No" in step S16), the emergency reporting unit 99 transmits an emergency report to the external device 4 and predesignated report addressees such as the police and a security company via the communication unit 18 (step S17). The operator of the external device 4 that has received the emergency report checks the security cameras of the store in which the merchandise item registration apparatus 1 is installed, and contacts the store. The operator of the external device 4 then takes appropriate measures. After step S17, the process moves on to step S19.

If the photographed object is not similar to any emergency-indicating event ("No" in step S15), the processing unit 9 determines whether the drawer opening/closing sensor 13*a* has detected closing of the cash drawer 13 (step S18). If the cash drawer 13 has not been closed ("No" in step S18), the process returns to step S12, new image data is retrieved, and the search for a photographed object is performed at predetermined intervals.

If the cash drawer 13 has been closed ("Yes" in step S18), the process moves on to step S19. To be more specific, while the operator leaves the cash drawer 13 open, a check is made to determine whether there is an emergency-indicating event on the photographing table 16.

If the determination result in step S16 or S18 is "Yes", or after step S17, the processing unit 9 outputs a photographing end signal to the photographing device 15, to cause the photographing device 15 to end the photographing (step S19).

Figure 7A:
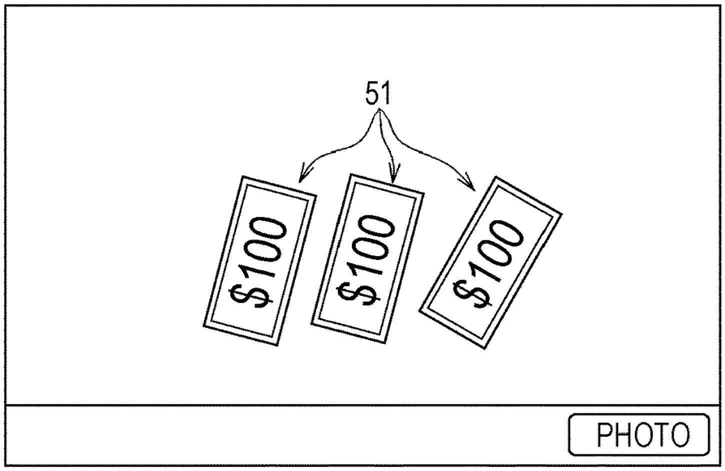
FIGS. 7A through 7C are diagrams illustrating examples of a screen during an emergency reporting process according to the first embodiment.
Figure 7B:
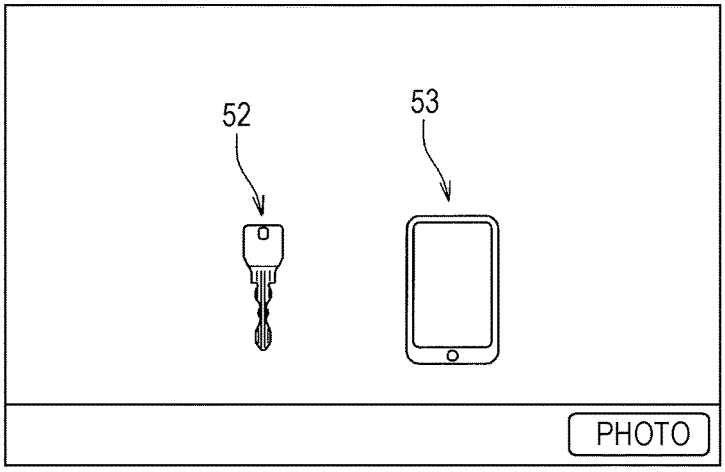
Figure 7C:
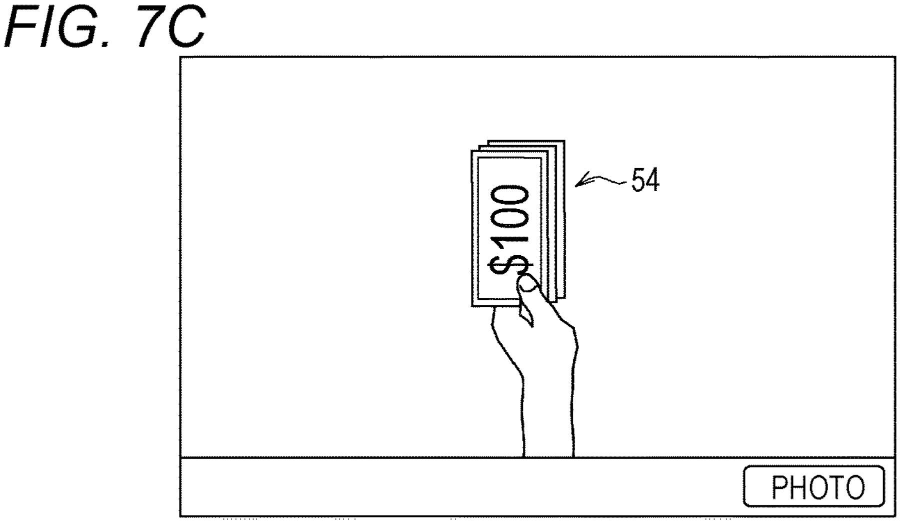

Although 100-dollar bills 51, which are the largest denomination bills, are photographed as shown in FIG. 7A in the above described example case, an emergency state may be determined when a key 52 or a smartphone 53 is photographed as shown in FIG. 7B. Although the 100-dollar bills 51 placed on the photographing table 16 are photographed in the above described example case, an emergency state may be determined when 100-dollar bills 54 held by the operator (store clerk) are photographed as shown in FIG. 7C.

As described above, the merchandise item registration apparatus 1 according to the first embodiment compares an object photographed while the cash drawer 13 is left open with emergency-indicating events (such as bills), and determines the degrees of similarity to the emergency-indicating events. Here, an emergency state is a state where an operator (store clerk) needs to ask for help due to an act of a third party. In an example case in this embodiment, a third party demands bills in the cash drawer 13 from the operator (a criminal act such as robbery or extortion is conducted).

Examples of emergency-indicating events include objects demanded by perpetrators (such as bills that are the main motive of crimes, an emergency buzzer, a portable telephone with which contact with the outside can be made), and objects used for crimes (such as keys to the store or vehicles, and weapons). A check is made to determine whether a photographed object is similar to an emergency-indicating event, and, if the photographed object is similar to an emergency-indicating event, an emergency report is transmitted to the outside. Accordingly, with the merchandise item registration apparatus 1, an emergency report can be transmitted through a highly-secretive operation using an object recognition technique.

[Second Embodiment]

In the merchandise item registration apparatus 1 according to the first embodiment, when an object demanded by a perpetrator (such as bills that are the main motive of a crime, or a portable telephone with which contact with the outside can be made), an object to be used for a crime (such as the key to the cash drawer 13, the key to the shop or a vehicle, or a weapon), or the like is photographed by the photographing device 15 while the cash drawer 13 is left open, an emergency state is determined, and an emergency report is transmitted to the external device 4.

However, depending on the command method implemented by a perpetrator, it might not be possible to transmit an emergency report to the external device 4 and the predesignated report addressees such as the police and a security company. For example, a perpetrator commands the operator to only open the cash drawer 13, reaches over the counter table 2 (see FIG. 1), and grabs bills out of the cash drawer 13.

In this case, the possibility that the object (such as bills) demanded by the perpetrator is placed on the photographing table 16 is low, and therefore, an emergency report cannot be transmitted to the external device 4.

In view of this, in a merchandise item registration apparatus 1 according to the second embodiment, when a certain gesture made by the operator (store clerk) is photographed by the photographing device 15, an emergency state is determined, and an emergency report is transmitted to the external device 4.

At the time of a crime, the perpetrator might carefully watch actions made by the operator in places hidden from himself/herself, but not pay much attention to actions made in areas visible to himself/herself. For example, when the perpetrator reaches over the counter table 2 and grabs bills out of the cash drawer 13, the attention of the perpetrator is drawn to the bills in the cash drawer 13 and actions being made by the operator in the space that is located below the counter table 2 and is thus hidden from the perpetrator.

Therefore, the possibility that the perpetrator feels suspicious about the movement of hands stuck out in front of him/her is considered to be low. In the description below, the structure and the like of the merchandise item registration apparatus 1 according to the second embodiment will be described in detail.

Figure 8:
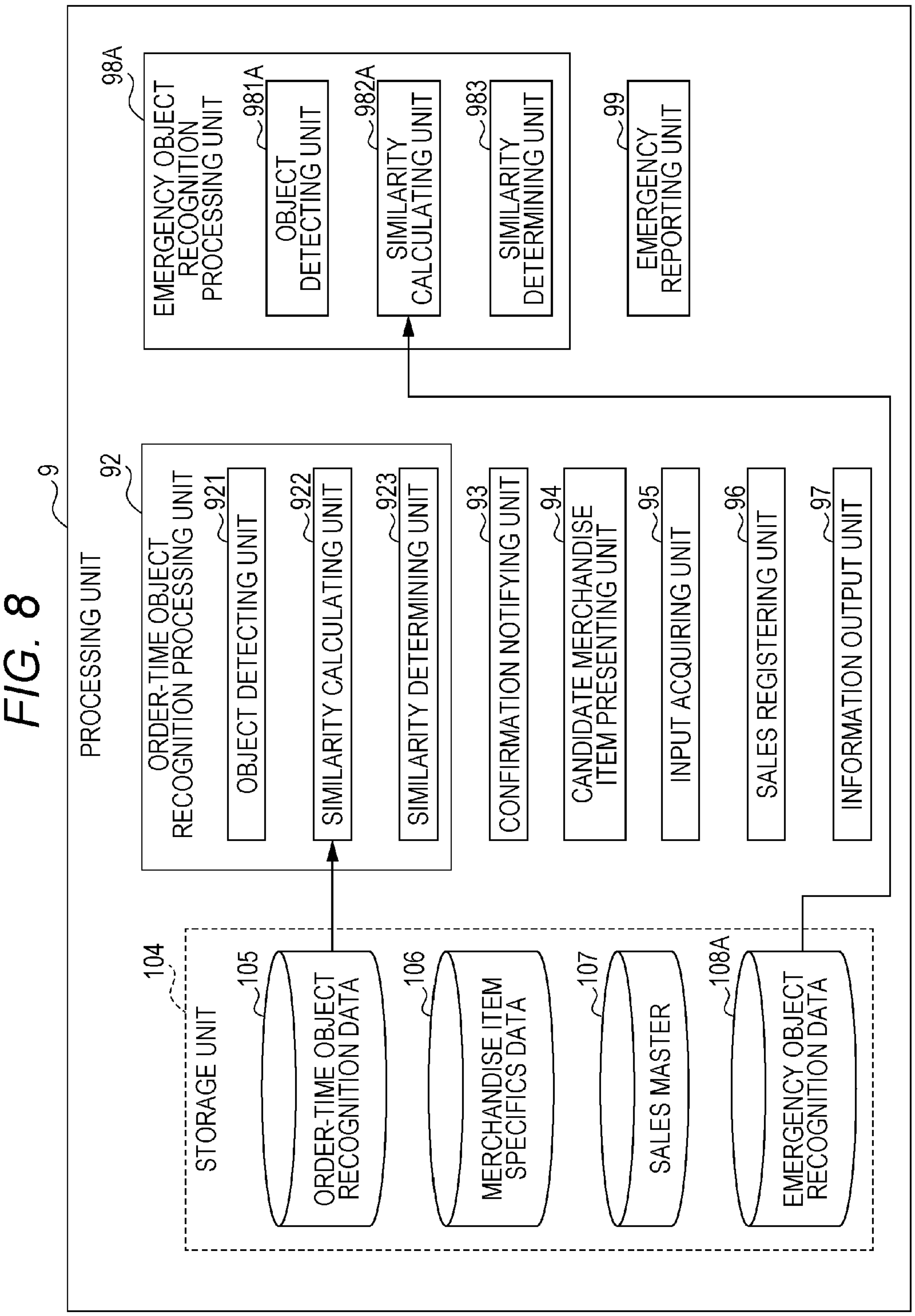
FIG. 8 is a logical block diagram illustrating the structure of a merchandise item registration apparatus according to a second embodiment.

FIG. 8 is a logical block diagram illustrating the structure of a merchandise item registration apparatus according to a second embodiment;

In the second embodiment, the contents of emergency object recognition data 108A in the storage unit 104, and an emergency object recognition processing unit 98A differ from those of the first embodiment. In the description below, the different aspects from the first embodiment will be described.

In the emergency object recognition data 108A, template information generated by combining modeled feature amounts of each of the emergency-indicating events is registered in advance.

Here, an emergency-indicating event assumed in the second embodiment is a shape or a gesture that can be made with a hand (hands) during a crime (in an emergency state), and is preferably a movement that will not provoke the perpetrator, or a natural movement that is to notify the outside of the emergency state but is not to be noticed by the perpetrator.

For example, all the fingers may be spread or curled, the hands may be repeatedly opened and closed or be repeatedly moved vertically or horizontally. The operator has learned beforehand about the shape or the gesture to be made with a hand (hands) to indicate an emergency state.

The emergency object recognition processing unit 98A includes an object detecting unit 981A, a similarity calculating unit 982A, and a similarity determining unit 983.

The object detecting unit 981A cuts out and detects only the event to be identified (such as a shape or a gesture made with a hand (hands)), like the object detecting unit 981 of the first embodiment. In addition to that, the object detecting unit 981A identifies the location of the detected event.

In a case where the event to be identified is a shape or a gesture made with a hand (hands), a check is made to determine whether the hand(s) is stuck out from the operator side or whether the hand(s) is stuck out from the customer side. Since any customer does not know about the gesture to be made for reporting an emergency, an emergency report is not made when a hand or hands are stuck out from the customer side.

The similarity calculating unit 982A identifies the types of the respective available merchandise items based on the separated images of the respective detected objects. With respect to each of the separated images, the similarity calculating unit 982A calculates feature amounts that are the size, the shape, the color shade, and the surface state such as irregularities on the surface.

The similarity calculating unit 982 further compares the feature amounts of the respective separated images with the respective feature amounts of the emergency-indicating events (such as shapes and gestures to be made with a hand or hands) recorded in the emergency object recognition data 108A, to calculate the degrees of similarity between the respective separated images and the emergency-indicating events recorded in the emergency object recognition data 108A.

Where feature amounts to be supposedly obtained from the emergency-indicating events recorded in the emergency object recognition data 108A each have the degree of similarity of 100%, the degrees of similarity calculated here indicate how similar the feature amounts of the respective separated images are to those of the recorded emergency-indicating events. In a case where there are two or more kinds of feature amounts, the similarity calculating unit 982A performs a comprehensive evaluation based on the feature amounts, and each of the feature amounts may be weighted.

It should be noted that there are no particular limits on the method of calculating the degrees of similarity between the feature amounts of photographed merchandise item images and the feature amounts of images of the emergency-indicating events (such as shapes and gestures to be made with a hand or hands) recorded in the emergency object recognition data 108A. For example, the degrees of similarity between the feature amounts of photographed events and the feature amounts of the respective emergency-indicating events recorded in the emergency object recognition data 108A may be calculated as absolute evaluations, or may be calculated as relative evaluations.

Figure 9:
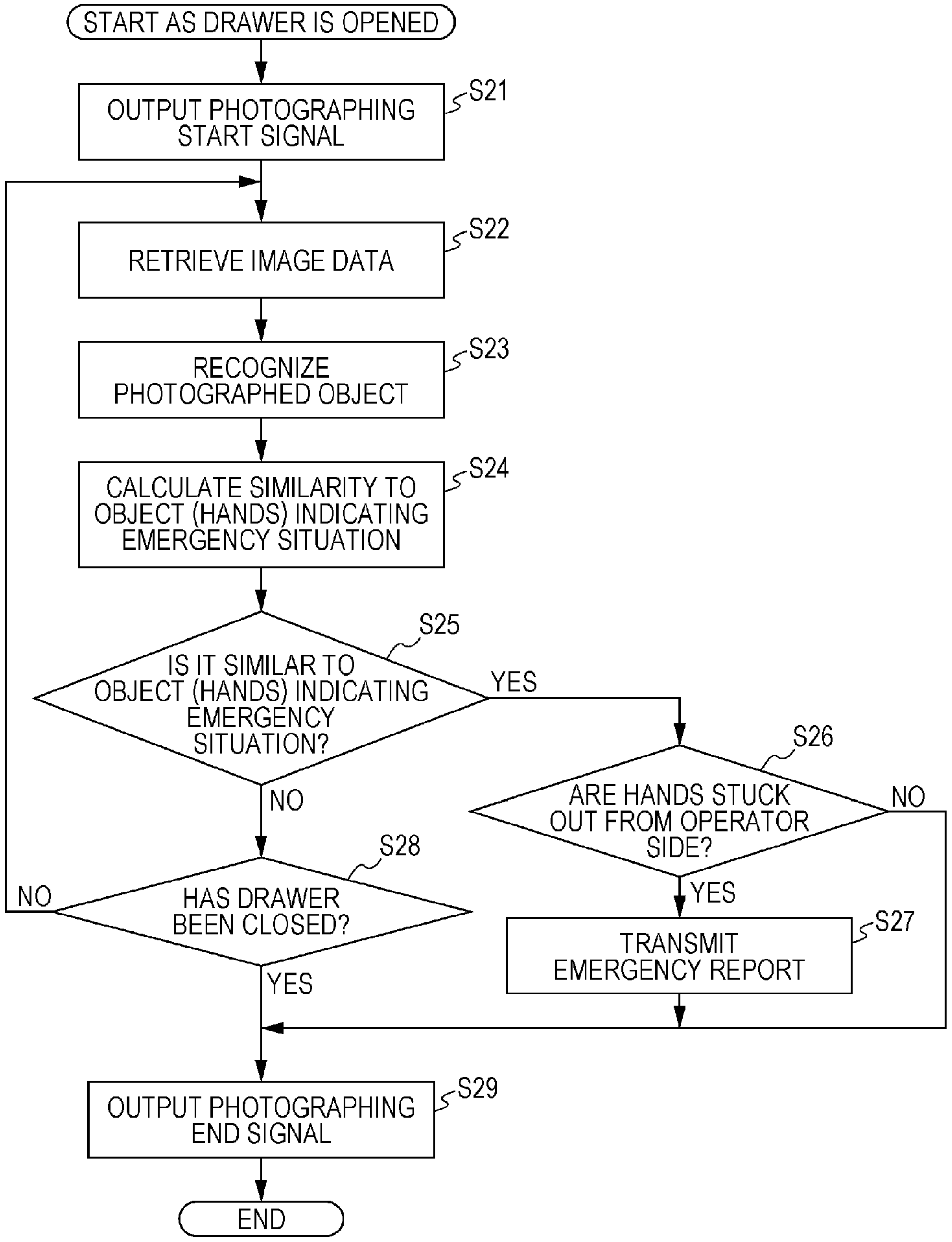
FIG. 9 is a diagram illustrating an example of a flowchart of the entire operation in an emergency reporting process in the merchandise item registration apparatus according to the second embodiment.

Referring now to FIG. 9, an emergency reporting process using the merchandise item registration apparatus 1 according to the second embodiment is described.

The procedures in steps S21 through S23 are the same as the procedures in steps S11 through S13 shown in FIG. 6, and the procedures in steps S27 through S29 are the same as the procedures in steps S17 through S19 shown in FIG. 6. Therefore, those procedures will not be explained below.

After step S23, the similarity calculating unit 982A reads the feature amounts of the photographed object from the retrieved image, and calculates the degrees of similarity to emergency-indicating events by comparing the read feature amounts with the feature amounts of the respective emergency-indicating events (such as shapes and gestures made with a hand or hands) registered in the emergency object recognition data 108A (step S24).

In a case where the event to be identified is a shape or a gesture made with a hand (hands), the location of the photographed object is identified, to determine whether the hand(s) is stuck out from the operator side or whether the hand(s) is stuck out from the customer side.

The similarity determining unit 983 then determines to which emergency-indicating event (such as a shape or a gesture made with a hand or hands) the photographed object is similar (step S25). If there is a similar emergency-indicating event ("Yes" in step S25), the process moves on to step S26. If there is not a similar emergency-indicating event ("No" in step S25), the process moves on to step S28. If there is not a similar emergency-indicating event, nothing might have been photographed.

Figure 10A:
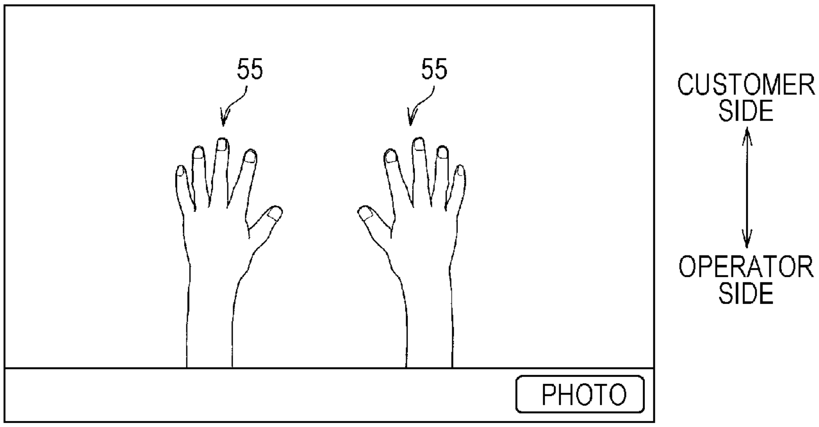
FIGS. 10A through 10C are diagrams illustrating examples of a screen during an emergency reporting process according to the second embodiment.
Figure 10B:
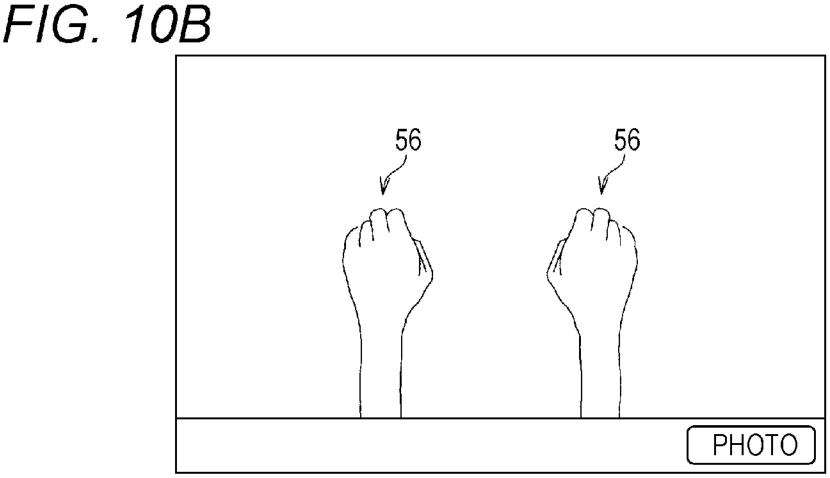
Figure 10C:
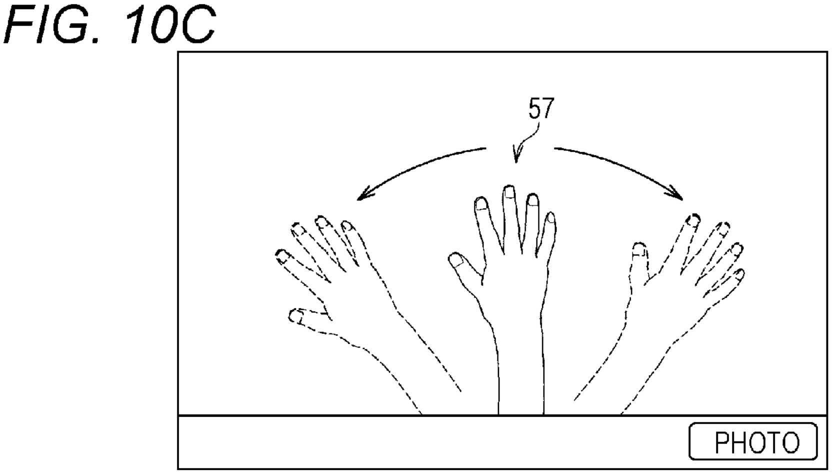

Specifically, in a case where both hands being spread or both hands being clinched indicate an emergency state as determined beforehand, the photographed object is determined to be similar to an emergency-indicating event when hands 55 and 55 with fingers spread are photographed as shown in FIG. 10A, or when hands 56 and 56 with fingers closed are photographed as shown in FIG. 10B. In a case where a gesture made with a hand moving right and left indicates an emergency state as determined beforehand, the photographed object is determined to be similar to an emergency-indicating event when a hand 57 moving right and left is photographed as shown in FIG. 10C.

If the photographed object is similar to an emergency-indicating event ("Yes" in step S25), the processing unit 9 determines whether a hand or hands are stuck out from the operator (store clerk) side (step S26).

This procedure is carried out to prevent wrong transmission of an emergency report. This procedure is effective in a case where a customer's hand stuck out above the photographing table 16 is inadvertently photographed, for example. Therefore, this procedure may not be carried out, or some other procedure for preventing wrong transmission of an emergency report may be carried out.

If the hand(s) is stuck out from the operator side ("Yes" in step S26), the process moves on to step S27. If the hand(s) is not stuck out from the operator side ("No" in step S26), the process moves on to step S29.

As described above, the merchandise item registration apparatus 1 according to the second embodiment determines an emergency state when a predetermined shape or gesture made with a hand or hands is photographed by the photographing device 15, and transmits an emergency report to the external device 4 and predesignated report addressees such as the police and a security company. Accordingly, an emergency report can be transmitted, regardless of the type of command from the perpetrator.

[Modifications]

Although embodiments of the present invention have been described so far, the present invention is not limited to them, and other embodiments can be formed without departing form the scope of the claims. Modifications of the respective embodiments will be described below.

In each of the first and second embodiments, the merchandise item registration apparatus 1 including the stand-type photographing device 15 that takes images of available merchandise items on the photographing table 16 from directly above has been described as an emergency reporting apparatus. However, the merchandise item registration apparatus 1 is not limited to the above, and may have various other structures.

Figure 11:
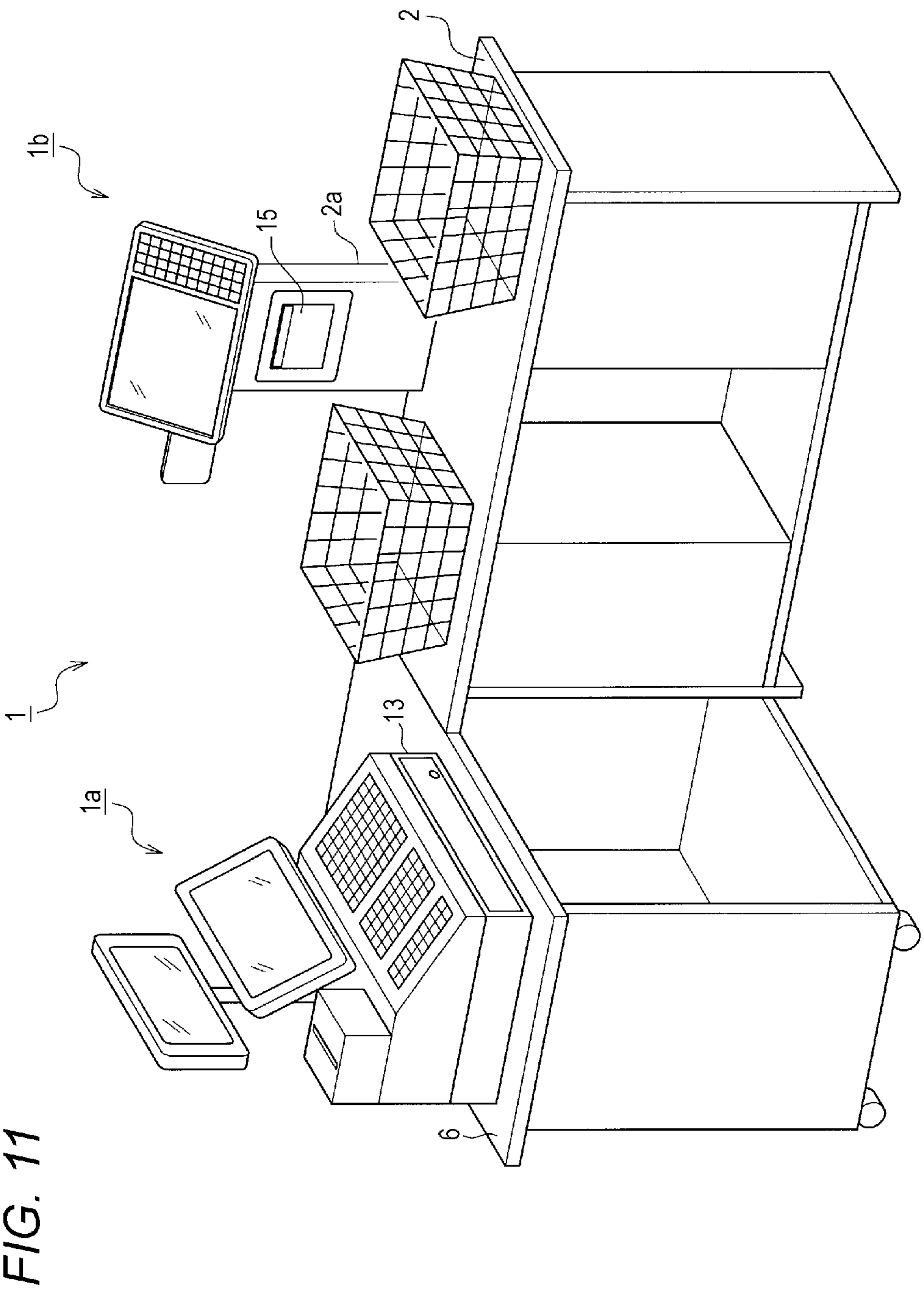
FIG. 11 is a perspective view of the exterior of a merchandise item registration apparatus according to a modification.

For example, the merchandise item registration apparatus 1 may include a thin rectangular housing 2*a* placed on the counter table 2, as shown in FIG. 11. The photographing device 15 covered with a read window is provided in the front surface of the housing 2*a*.

In the first embodiment, an emergency state is determined when bills or the like are photographed by the photographing device 15, and an emergency report is transmitted to the external device 4. However, the determination of an emergency state is not limited to that, and an emergency state may be determined in accordance with a total amount of photographed bills or a combination or sequence of photographed objects. With this, even if a bill is inadvertently photographed by the photographing device 15 during a transaction, wrong transmission of an emergency report can be prevented.

Specifically, when the total amount of bills photographed by the photographing device 15 is larger than the amount normally used in one transaction in the store, an emergency state may be determined.

Also, when a combination of bills with a low possibility of being used together in a normal transaction are photographed by the photographing device 15, an emergency state may be determined. A combination of bills with a low possibility of being used together in a transaction is two 50-dollar bills, or 10 or more 10-dollar bills, for example.

Also, when bills are photographed by the photographing device 15 in a sequence with a low possibility of being used in a normal transaction, an emergency state may be determined. In a sequence with a low possibility of being used in a transaction, 100-dollar bills are photographed only a few seconds after 100-dollar bills are photographed.

In the second embodiment, an emergency state is determined when a predetermined shape or gesture made with a hand or hands is photographed by the photographing device 15, and an emergency report is transmitted to the external device 4 and predesignated report addressees such as the police and a security company.

However, the determination of an emergency state is not limited to the above, and an emergency-indicating event may not be a shape or a gesture made with a hand or hands, as long as it can be photographed during a crime (in an emergency state). For example, an emergency state may be determined when a certain object designated in advance is photographed.

In that case, the object to be used in determining an emergency state is preferably a merchandise item not sold in the store, so that the object can be distinguished from the available merchandise items to be subjected to merchandise item registration. The merchandise item not sold in the store may be a fictitious object (such as red-colored Japanese radish). The object to be used in determining an emergency state is preferably placed on the side of the merchandise item registration apparatus 1, for example.

In each of the first and second embodiments, the merchandise item registration apparatus 1 transmits an emergency report to the external device 4 and predesignated report addressees such as the police and a security company. However, some other information such as a sign for help may be transmitted, instead of an emergency report.

The invention claimed is:

1. An emergency reporting apparatus comprising:

a determining unit configured to determine an emergency state based on an image photographed by a photographing unit while a cash drawer keeping cash therein is left open; and a reporting unit configured to transmit an emergency report to a predetermined report addressee based on a result of the determination made by the determining unit, wherein the determining unit determines the emergency state based on a degree of similarity between a feature amount of an emergency-indicating event and a feature amount of a photographed object, the feature amount of the photographed object being calculated from the photographed image, and wherein the emergency-indicating event is a predetermined shape or gesture made with a hand that is stuck out from an operator side.

2. The emergency reporting apparatus according to claim 1, wherein:

the photographing unit photographs an area in which an object to be subjected to merchandise item identification is placed, and the determining unit determines the emergency state based on a photographed image of the area photographed by the photographing unit.

3. The emergency reporting apparatus according to claim 1, wherein:

the photographing unit photographs a predetermined area, the predetermined area being different from an area in which the cash drawer is provided, and the determining unit determines the emergency state based on a photographed image of the predetermined area photographed by the photographing unit.

4. The emergency reporting apparatus according to claim 1, wherein the determining unit does not determine the emergency state while the cash drawer is closed.

5. An emergency reporting method comprising:

determining an emergency state based on an image photographed by a photographing unit while a cash drawer keeping cash therein is left open; and transmitting an emergency report to a predetermined report addressee based on a result of the determination, wherein the determining includes determining the emergency state based on a degree of similarity between a feature amount of an emergency-indicating event and a feature amount of a photographed object, the feature amount of the photographed object being calculated from the photographed image, and wherein the emergency-indicating event is a predetermined shape or gesture made with a hand that is stuck out from an operator side.

6. A non-transitory computer-readable recording medium storing a program for causing a computer of an emergency reporting apparatus to carry out operations comprising:

determining an emergency state based on an image photographed by a photographing unit while a cash drawer keeping cash therein is left open; and transmitting an emergency report to a predetermined report addressee based on a result of the determination, wherein the determining includes determining the emergency state based on a degree of similarity between a feature amount of an emergency-indicating event and a feature amount of a photographed object, the feature amount of the photographed object being calculated from the photographed image, and the emergency-indicating event is a predetermined shape or gesture made with a hand that is stuck out from an operator side.

7. The emergency reporting apparatus according to claim 1, wherein the photographing unit begins photographing in accordance with opening of the cash drawer, and continues the photographing until the cash drawer is closed.

8. The emergency reporting method according to claim 5, wherein the photographing unit starts photographing in accordance with opening of the cash drawer, and continues the photographing until the cash drawer is closed.

9. The computer-readable recording medium according to claim 6, wherein the photographing unit starts photographing in accordance with opening of the cash drawer, and continues the photographing until the cash drawer is closed.

* * * * *